Patented July 26, 1949

2,477,219

UNITED STATES PATENT OFFICE 2,477,219

METHOD AND MEANS OF PREVENTING FLUID LOSS THROUGH POROUS WALLS

Orien W. Van Dyke, Houston, Tex., assignor to Magnet Cove Barium Corporation, Houston, Tex., a corporation of Arkansas No Drawing. Application March 21, 1947, Serial No. 736,407

5 Claims. (Cl. 252—8.5)

This invention relates to a method and product which may be employed in drilling and carrying out other processes in wells for the purpose of preventing or reducing loss of fluid from the well bore into the surrounding formations.

The loss of fluid from the well bore into the surrounding formations is not only highly undesirable because of the actual loss of the mud or other fluid from the well and the fact that such a fluid is many times quite expensive, but is further undesirable from the standpoint that such loss may occur into formations otherwise capable of producing desired materials such as oil or gas, and having entered such formations may damage the same so as to retard their later production and reduce their ultimate value, or in other cases to make it difficult to clean such formations and bring them into production.

Attempts have been made in the past to reduce the fluid or mud loss into the formations surrounding the well bore by the introduction into the mud or other fluid of various substances such as sawdust, fish scales, cotton seed hulls, flax seed, fragments of foil of organic nature which are flexible, infrangible and water-insoluble and substantially fluid impervious, and the like. However, substances previously used or suggested for this purpose have either been of such a nature that because of their relatively small size they are relatively unsuitable for stopping large pores, crevices or openings in the formations, or, if of relatively large size and of such a nature that they will become wet and permit the passage of water while halting the passage of mud fluid, they are of such a nature that they will be hard and stiff and very difficult to pump and otherwise handle. Those substances which are of relatively large size but which become soft and readily pumpable and otherwise suitable for incorporation into drilling fluid are impervious to water and it has been found that they are not satisfactory for the purpose because a mud cake will not build up across them and that for this reason the flowing mud current prevents them from becoming firmly lodged and providing a stable wall over the surface of the porous formation.

It has been found that far better results can be obtained through the use in the mud fluid of a material which though soft and pumpable and in sheet-like form so that it will bridge the pores of a porous formation, will itself be sufficiently porous so that it will permit the passage of water but will filter out the comminuted material ordinarily carried by drilling fluid and cause it to form a cake over the porous formation so that thereafter the washing of the drilling fluid past the formation will not tend to readily displace the materials closing off the porous wall. A material which has been found to be suitable for this purpose consists of a mass of fragments of sheets of water-insoluble fibers which are capable, however, of being wetted with water, the fibers being bound together in the sheets by means of a water-insoluble binder. Any suitable water-insoluble but water-wettable fibers may be employed, the only requirement being that the fibers retain at least a substantial portion of their strength when wet with water and that they be not soluble in water. Perhaps the most common fibers meeting these qualifications will be found under the general heading of cellulose fibers.

As for the binder to be employed, it may be of such a nature that it is carried in some liquid vehicle other than water which may be dried or otherwise removed or chemically changed. Very desirable binders are the thermosetting and thermoplastic resins. Examples of suitable thermosetting plastics are the phenol formaldehyde resins, the urea resins, and the melamine resins. From the standpoint of ease of handling, those resins which are available in water dispersible form are most desirable.

When such resins are in water dispersible form they may be placed in suspension and caused to impregnate the paper pulp or mass of cellulose fibers, and after the water has been dried out of the paper so formed, the same is heated to a temperature which will cause the setting or solidification of the plastic, thereby binding firmly together the fibers of the paper. After being set this plastic is no longer susceptible to action by water. It may be wet by water and becomes flexible and pliable just as other paper does when wet by water, but it does not disintegrate as other paper does because unlike paper made in the usual way, its fibers are bonded together by material which is not affected by the water. Such paper is customarily termed "wet-strength" paper and can be pumped into a well and caused to plug or close the openings in the formation. Thereafter, it will permit the passage of water through the paper and thus encourage a deposit of a mud cake over the surface of the formation.

It will be appreciated that in some instances the drilling fluid employed in drilling wells is not an aqueous fluid but employs some other liquid vehicle, and in such case a binder would, of course, be selected for the fibers which would not be soluble in the liquid vehicle being employed, and the fibers themselves would be of a nature such that they would be wettable by but insoluble in the liquid vehicle.

In the case of the use of the liquid such as oil as the liquid vehicle in the drilling fluid, cellulose fibers would again be suitable because they are insoluble in but wettable by the oil, and the same binders as above indicated for use with water might also be used with oil. The requirements to be observed in the case of the fibers, however, are that the fibers must be wettable by the liquid vehicle but insoluble therein, and that the binder must be insoluble in the liquid vehicle.

In the practice of this invention a mass of fragments of sheets of material such as the wet-strength paper hereinabove described will be incorporated into the usual drilling mud which customarily consists of a mixture of water and comminuted materials such as clays and the like, and after being thoroughly mixed with and wetted by such drilling fluid, the drill fluid will be pumped into the well with the fragmented sheets of cellulose fiber and these sheets will tend to cover up and close the porous surface of the formation into which the fluid is being lost, after which they will serve as a filter to permit the passage of water from the drilling fluid but hold back the comminuted material in the drilling fluid and thus promote the formation of a cake over the porous formation. This will build a wall over the porous formation which will serve the purpose of preventing further loss of drilling fluid and contamination of the formation and yet will provide a wall which may readily be removed when it is desired to bring the formation into production.

As a means of making the mass of fragmented sheets of cellulose fibers more readily wettable by and miscible with the drilling fluid, the surfaces of such sheets are preferably coated with some water-avid substance such as for example a clay of the type customarily used in drilling fluid, among which is bentonite. The sheets may be coated with this water-avid substance in any suitable manner, and in the case of bentonite this may be done by treating the surfaces of the sheets with a thin water slurry of bentonite and then permitting them to dry.

The sizing of the sheets with the bentonite or other water-avid material may, however, be accomplished in any suitable well-known manner.

From the foregoing it will be appreciated that there has been provided by this invention a method of reducing fluid loss in earth bore holes and a fluid for use in earth bore holes which is of such a nature that it will reduce such losses of drilling fluid, together with an ingredient or material which may be used in such fluid and made readily miscible therewith.

Means has thus been provided for carrying out and accomplishing all of the objects set forth in connection with this invention.

Having described my invention, I claim:

1. The method of reducing fluid loss in earth bore holes which comprises introducing into the bore hole fluid fragmented sheets of wet strength paper having water-wettable, water-insoluble fibers bound together with a water-insoluble binder.

2. The method of reducing fluid loss in earth bore holes which comprises introducing into the bore hole fluid fragmented sheets of wet strength paper having fibers which are wettable by but insoluble in the fluid and which are bound together with a binder insoluble in the fluid.

3. The method of reducing fluid loss in earth bore holes which comprises introducing into the bore hole fluid, fragmented sheets of wet strength paper having water-wettable, water-insoluble fibers bound together with a water-insoluble binder, said sheets having a water-avid sizing over its exposed surfaces.

4. The method of reducing fluid loss in earth bore holes which comprises introducing into the bore hole fluid, fragmented sheets of wet strength paper having water-wettable, water-insoluble fibers bound together with a water-insoluble binder, and a clay sizing over its exposed surfaces.

5. The method of reducing fluid loss in earth bore holes which comprises introducing into the bore hole fluid, fragmented sheets of wet strength paper having water-wettable, water-insoluble fibers bound together with a water-soluble binder, and a sizing of bentonite over the exposed surfaces of said sheets.

ORIEN W. VAN DYKE.

REFERENCES CITED

The following references are of record in the file of this patent:

UNITED STATES PATENTS

| Number | Name | Date |
|---|---|---|
| 1,716,925 | Loomis | June 11, 1929 |
| 1,807,082 | Boynton | May 26, 1931 |
| 2,079,517 | McQuiston | May 4, 1937 |
| 2,119,829 | Parsons | June 7, 1938 |
| 2,173,130 | Oglesby | Sept. 19, 1939 |
| 2,291,079 | Hofferbert | July 28, 1942 |
| 2,353,372 | Stone | July 11, 1944 |
| 2,398,347 | Anderson | Apr. 16, 1946 |

OTHER REFERENCES

Core: "Application of cellulosic foil to mud and cementing operations," article in The Oil Weekly, Sept. 13, 1943, pages 25, 26, and 28.

Uren: "Drilling fluid technology," article in The Petroleum Engineer, November 1942, pages 43, 44, 46, 49, 51, and 52.